United States Patent
Chen (10) Patent No.: US 8,006,994 B2
(45) Date of Patent: Aug. 30, 2011

(54) AUXILIARY WHEEL STRUCTURE FOR KID BICYCLE

(75) Inventor: Yu-Gang Chen, Tainan County (TW)

(73) Assignee: Far East University, Tainan County (TW)

(*) Notice: Subject to any disclaimer, the term of this patent is extended or adjusted under 35 U.S.C. 154(b) by 61 days.

(21) Appl. No.: 12/571,651

(22) Filed: Oct. 1, 2009

(65) Prior Publication Data

US 2010/0084835 A1    Apr. 8, 2010

Related U.S. Application Data

(60) Provisional application No. 61/102,875, filed on Oct. 6, 2008.

(51) Int. Cl.
  *B62J 15/00*    (2006.01)
(52) U.S. Cl. ........................................ 280/293; 280/301
(58) Field of Classification Search .................. 280/293, 280/295, 298, 301, 304
   See application file for complete search history.

(56) References Cited

U.S. PATENT DOCUMENTS

| | | | | |
|---|---|---|---|---|
| 4,326,729 A | * | 4/1982 | Luckowski et al. | 280/304 |
| 4,615,535 A | * | 10/1986 | McMurtrey | 280/293 |
| 4,810,000 A | * | 3/1989 | Saunders | 280/293 |
| 5,054,803 A | * | 10/1991 | Ellingsen, Jr. | 280/301 |
| 5,064,213 A | * | 11/1991 | Storch | 280/301 |
| 5,100,163 A | * | 3/1992 | Egley et al. | 280/293 |
| 5,352,403 A | * | 10/1994 | Egley | 280/293 |
| 6,113,122 A | * | 9/2000 | Plana | 280/293 |
| 6,318,745 B1 | * | 11/2001 | Sharp, III | 280/303 |
| 6,331,012 B1 | * | 12/2001 | Eisenmann et al. | 280/293 |
| 6,709,000 B1 | * | 3/2004 | Blake | 280/293 |
| 7,641,213 B1 | * | 1/2010 | Chen | 280/293 |
| 7,712,759 B2 | * | 5/2010 | Bell | 280/293 |

* cited by examiner

*Primary Examiner* — Anne Marie M Boehler
*Assistant Examiner* — Michael R Stabley
(74) *Attorney, Agent, or Firm* — WPAT, P.C.; Anthony King (57) ABSTRACT

An auxiliary wheel structure for kid bicycle includes a mounting bracket fixedly mounted to an end of a rear wheel hub of the bicycle, a lifting arm pivotally connected at an end to an upper through hole on the mounting bracket, and an auxiliary wheel axle pivotally connected at an inner end to a lower through hole on the mounting bracket and fixedly connected at an outer end to an auxiliary wheel. One of the lifting arm and the auxiliary wheel axle is provided with a small hole while the other one of them is provided with a plurality of adjusting holes. A control assembly can be extended through the small hole and one of the adjusting holes to change a pivotal interval between the lifting arm and the auxiliary wheel axle, and thereby adjust an inclination angle of the auxiliary wheel at each lateral side of the rear wheel.

7 Claims, 9 Drawing Sheets

AUXILIARY WHEEL STRUCTURE FOR KID BICYCLE

FIELD OF THE INVENTION

The present invention relates to a kid bicycle, and more particularly to an auxiliary wheel structure for mounting to each of two ends of a rear wheel hub of a kid bicycle to enable convenient folding and position adjustment of auxiliary wheels for the kid bicycle.

BACKGROUND OF THE INVENTION

Conventionally, a kid bicycle is provided with two auxiliary wheels that are separately connected to two ends of a rear wheel hub of the kid bicycle via two L-shaped bars, so as to provide the kid bicycle with increased balance for a small child to ride it safely without the risk of becoming tilted over. The auxiliary wheels give the kid bicycle extra support and protection, helping a small child to transit from a kid tricycle to the kid bicycle. However, when the child grows up and the auxiliary wheels are no longer needed, the auxiliary wheels fixedly connected to two lateral sides of the rear wheel via the L-shaped bars tend to touch and rub the ground surface whenever the child riding the bicycle makes a turn. In some undesirable conditions, the auxiliary wheels rubbing the ground surface would even cause tilting over of the bicycle. There are developed some auxiliary wheel folding mechanisms, and patent applications have been filed for them. A most common type of such auxiliary wheel folding mechanisms includes an elastic clamping plate provided in a hollow tubular axle of the auxiliary wheel. When the auxiliary wheel axle is turned to a predetermined angular position, the elastic clamping plate will extend into the hollow space in the axle and thereby holds the axle to that angular position. In another design, a torsional spring is used to turn the auxiliary wheel axle to a predetermined angle of inclination. Unlike the prior art, the present invention provides an auxiliary wheel structure to enable more convenient adjusting of the auxiliary wheels on a kid bicycle to a folded position.

SUMMARY OF THE INVENTION

A primary object of the present invention is to provide an auxiliary wheel structure for kid bicycle, so that auxiliary wheels connected to two lateral sides of a rear wheel of a kid bicycle can be conveniently adjusted to suspend in the air when the auxiliary wheels are not in use.

To achieve the above and other objects, the auxiliary wheel structure for kid bicycle according to a preferred embodiment of the present invention includes a mounting bracket having a predetermined length for fixedly mounted to each of two ends of a hub of a rear wheel of a kid bicycle, and the mounting bracket being provided at predetermined positions with an upper and a lower through hole, which are oriented to a direction the same as an extending direction of the bicycle; a lifting arm being pivotally connected at an upper end to the upper through hole of the mounting bracket via a pivotal connection assembly, and being provided at a middle portion with a row of adjusting holes; an auxiliary wheel axle being pivotally connected at an inner end to the lower through hole of the mounting bracket via a pivotal connection assembly, and fixedly connected at an outer end to an auxiliary wheel, and being further provided at a predetermined position with a small hole; and a control assembly for sequentially extending through one of the adjusting holes on the lifting arm and the small hole on the auxiliary wheel axle to pivotally connect the lifting arm and the auxiliary wheel axle to each other.

When the control assembly is adjusted to extend through a different one of the adjusting holes on the lifting arm, a pivotal interval between the pivotally connected lifting arm and auxiliary wheel axle can be changed to thereby control an angle of inclination of the auxiliary wheel at each lateral side of the rear wheel of the kid bicycle.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some embodiments thereof. For the purpose of easy to understand, elements that are the same in the illustrated embodiments are denoted by the same reference numerals.

Figure 2:
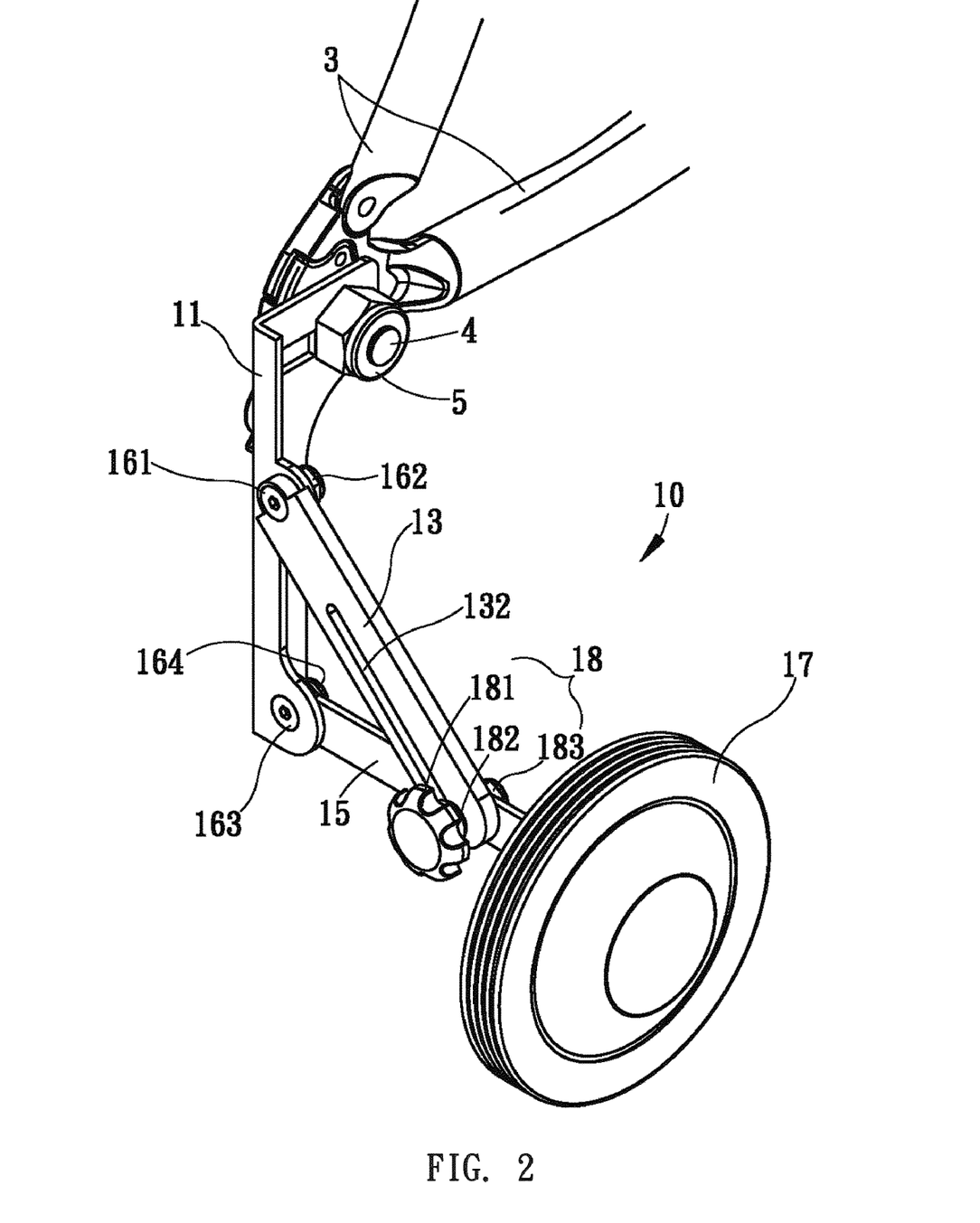
FIG. 2 is an assembled view of FIG. 1.
Figure 3:
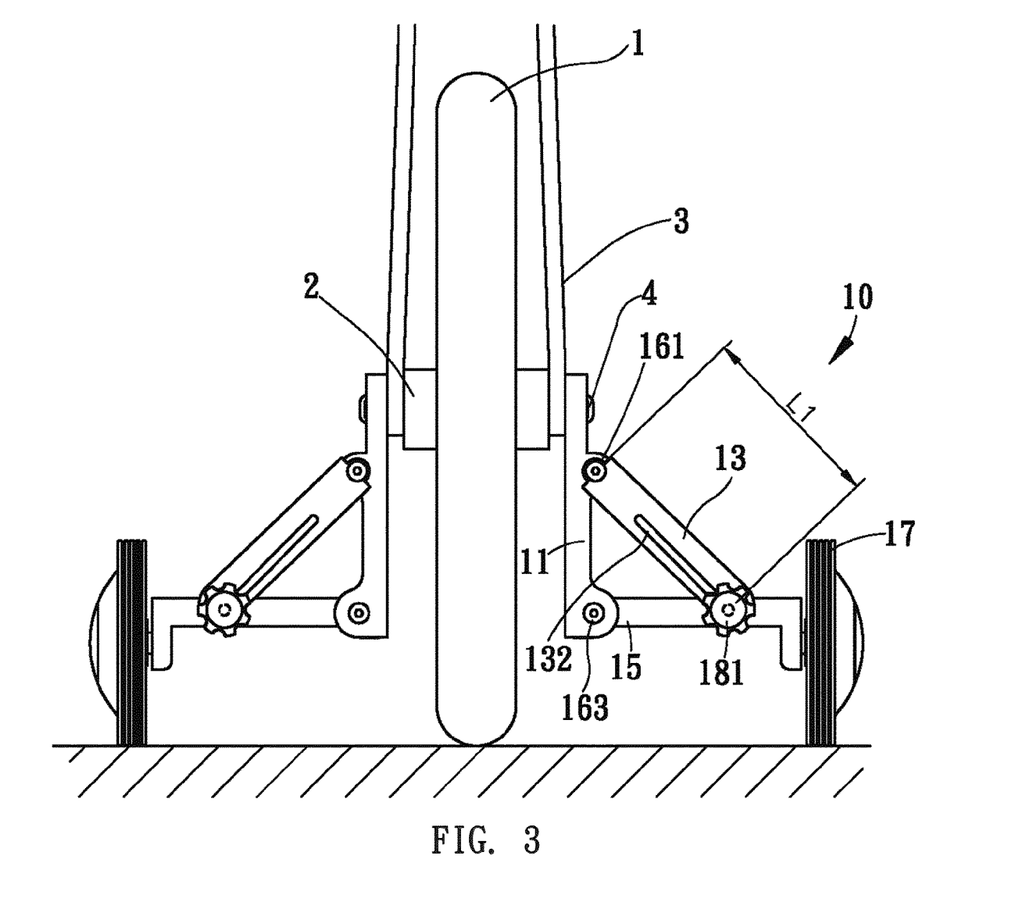
FIG. 3 is a fragmentary rear elevation view showing a kid bicycle having two sets of the auxiliary wheel structure of the first preferred embodiment mounted thereto.

Please refer to FIG. 3. The present invention relates to an auxiliary wheel structure 10 for mounting to each of two ends of a hub 2 of a rear wheel 1 of a kid bicycle. As can be seen from FIGS. 1 and 2, the auxiliary wheel structure 10 for kid bicycle according to a first preferred embodiment of the present invention includes a mounting bracket 11, a lifting arm 13, an auxiliary wheel axle 15, an auxiliary wheel 17, and a control assembly 18.

Figure 1:
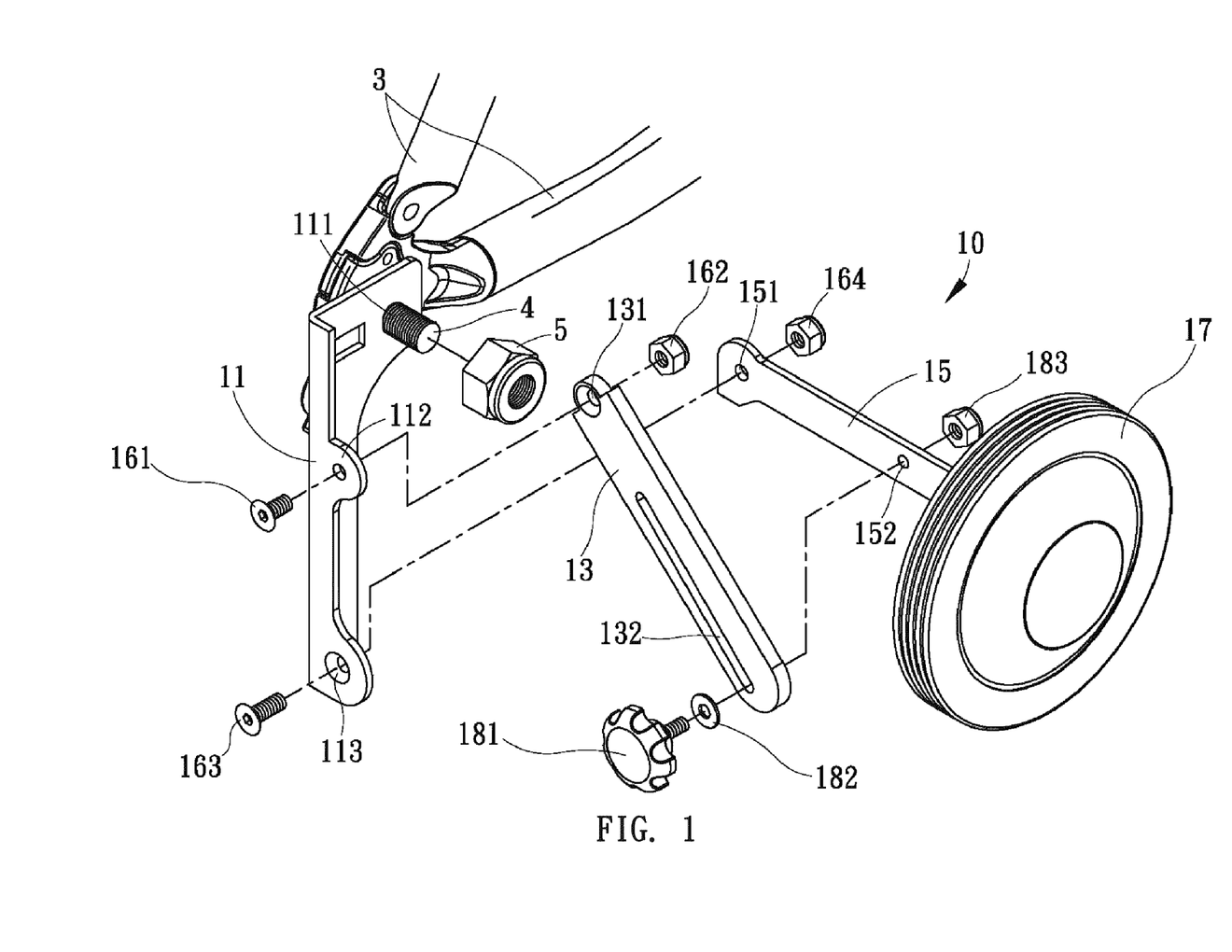
FIG. 1 is an exploded perspective view of an auxiliary wheel structure for kid bicycle according to a first preferred embodiment of the present invention.

The mounting bracket 11 is made of a metal plate to possess sufficient structural strength and has a substantially L-shaped cross section. A first part of the L-shaped mounting bracket 11 for connecting to the hub 2 is extended in a direction the same as an extending direction of the bicycle and is provided with a round hole 111, via which a screw rod 4 on a mounting plate provided at a joint of two stays 3, namely, a seat stay and a chain stay, can be sidewardly extended to engage with a nut 5 to thereby lock the first part of the L-shaped mounting bracket 11 to one end of the hub 2. A second part of the L-shaped mounting bracket 11 is extended from an edge of the first part at a right angle, and is provided with an upper and a lower through holes 112, 113 that are spaced along a free edge of the second part and oriented to the extending direction of the bicycle.

The lifting arm 13 is an elongated plate having two semicircular opposite ends. One of the two opposite ends of the lifting arm 13 is normally located at a higher position relative to the other end, and is referred to as the "upper end" of the lifting arm 13 herein, and the other end is referred to as the "lower end" of the lifting arm 13 herein. The lifting arm 13 is provided at the upper end with a round hole 131, and at a middle portion with a narrow long adjusting slot 132, which is extended closely to the lower end of the lifting arm 13. The lifting arm 13 is pivotally connected to the mounting bracket 11 by aligning the round hole 131 at the upper end of the lifting arm 13 with the upper through hole 112 on the second part of the L-shaped mounting bracket 11, and extending a bolt 161 through the aligned round hole 131 and upper through hole 112 to engage with a nut 162, as shown in FIG. 2.

The auxiliary wheel axle 15 is made of a metal material, and has an outer end fixedly connected to the auxiliary wheel 17 and an inner end provided with a round hole 151. The auxiliary wheel axle 15 is pivotally connected to the mounting bracket 11 by aligning the round hole 151 with the lower through hole 113 on the second part of the L-shaped mounting bracket 11 and extending a bolt 163 through the aligned round hole 151 and lower through hole 113 to engage with a nut 164, as shown in FIG. 2. The auxiliary wheel axle 15 is further provided at a predetermined position with a small hole 152.

The control assembly 18 includes a screw rod 181, which has an expanded head portion for a user to conveniently grip thereat to apply a force for turning and moving the screw rod 181. The auxiliary wheel axle 15 is pivotally connected to the lifting arm 13 by sequentially extending the screw rod 181 through a washer 182, the adjusting slot 132 on the lifting arm 13, and the small hole 152 on the auxiliary wheel axle 15 to engage with a nut 183.

Figure 4A:
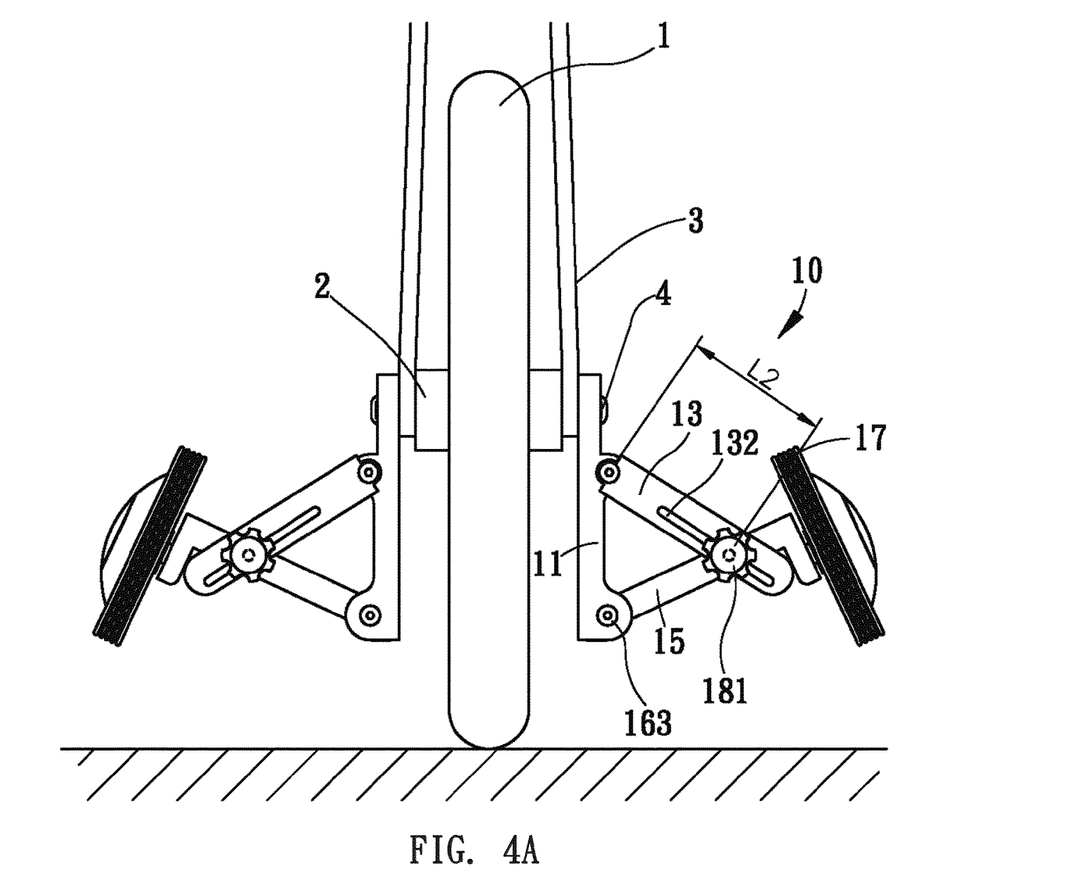
FIG. 4A is an elevation view showing two auxiliary wheels on the kid bicycle of FIG. 3 are adjusted to a lifted position.

When two sets of the auxiliary wheel structure have been assembled to two ends of the hub 2 in the above-described manner and it is desired to use the auxiliary wheels 17, simply move the screw rod 181 of each of the control assemblies 18 along the adjusting slot 132 to a position closest to the lower end of the lifting arm 13, bringing the auxiliary wheel axles 15 to pivotally turn to a position perpendicular to the mounting brackets 11 to contain a right angle between them, as shown in FIG. 3. At this point, the auxiliary wheels 17 fixedly connected to the outer ends of the auxiliary wheel axles 15 and the rear wheel 1 of the kid bicycle touch the ground surface at the same time, allowing a child riding the kid bicycle to maintain good stability and balance without the risk of falling. On the other hand, when it is desired not to use the auxiliary wheels 17, simply loosen the nut 183 from the screw rod 181 of each of the control assemblies 18 and grip at the expanded head of the screw rod 181 to move the same upward along the adjusting slot 132. At this point, the auxiliary wheel axle 15 and the auxiliary wheel 17 are lifted from the ground surface. Then, the nut 183 is tightened against the screw rod 18 again. As can be seen from FIGS. 3 and 4A, a pivotal interval between the pivotally connected lifting arm 13 and auxiliary wheel axle 15 is shortened from a first pivotal interval L1 when the auxiliary wheel 17 touches the ground surface as shown in FIG. 3 to a second pivotal interval L2 when the auxiliary wheel 17 is lifted from the ground surface as shown in FIG. 4A. That is, the auxiliary wheel axle 15 is upward pivotally turned about the bolt 163, at where the auxiliary wheel axle 15 is pivotally connected to the mounting bracket 11, to a lifted position higher than the ground surface by a proper distance. When both of the two auxiliary wheel axles 15 are brought to the above-described lifted position, the auxiliary wheels 17 fixedly connected to the outer ends of the auxiliary wheel axles 15 are suspended in the air at two lateral sides of the rear wheel 1 without the risk of touching and rubbing the ground surface to cause tilting over of the kid bicycle when the rider makes a turn.

Figure 4B:
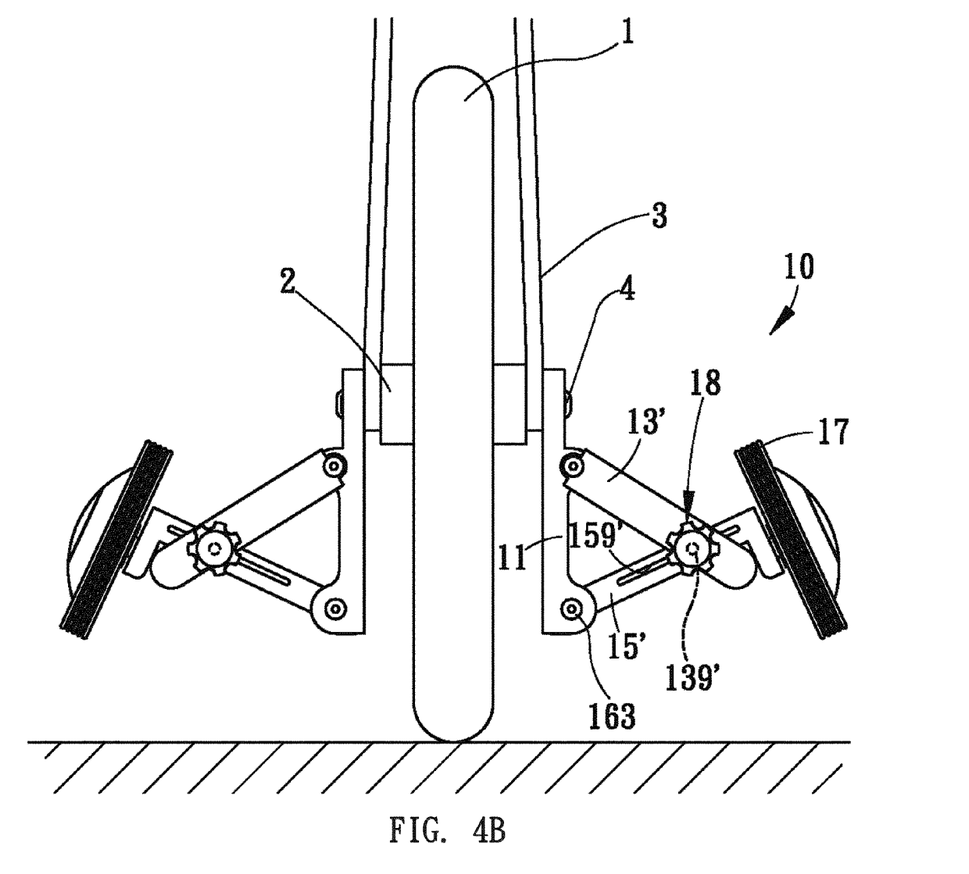
FIG. 4B is an elevation view showing a variation of the first preferred embodiment of the present invention with two auxiliary wheels on the kid bicycle adjusted to a lifted position.

In a variation of the first preferred embodiment of the present invention as shown in FIG. 4B, a lifting arm 13' is provided at a predetermined position with a small hole 139', and an auxiliary wheel axle 15' is provided with a narrow and long adjusting slot 159'. With these arrangements, the control assembly 18 can still be extended through the small hole 139' and the adjusting slot 159' to pivotally connect the lifting arm 13' and the auxiliary wheel axle 15' to each other. Similarly, when it is desired not to use the auxiliary wheels 17, each of the control assemblies 18 can be moved along the adjusting slot 159' toward an inner end of the auxiliary wheel axle 15' and locked again. At this point, the auxiliary wheels 17 fixedly connected to the outer ends of the auxiliary wheel axles 15 are suspended in the air at two lateral sides of the rear wheel 1 without the risk of touching the ground surface.

Figure 5A:
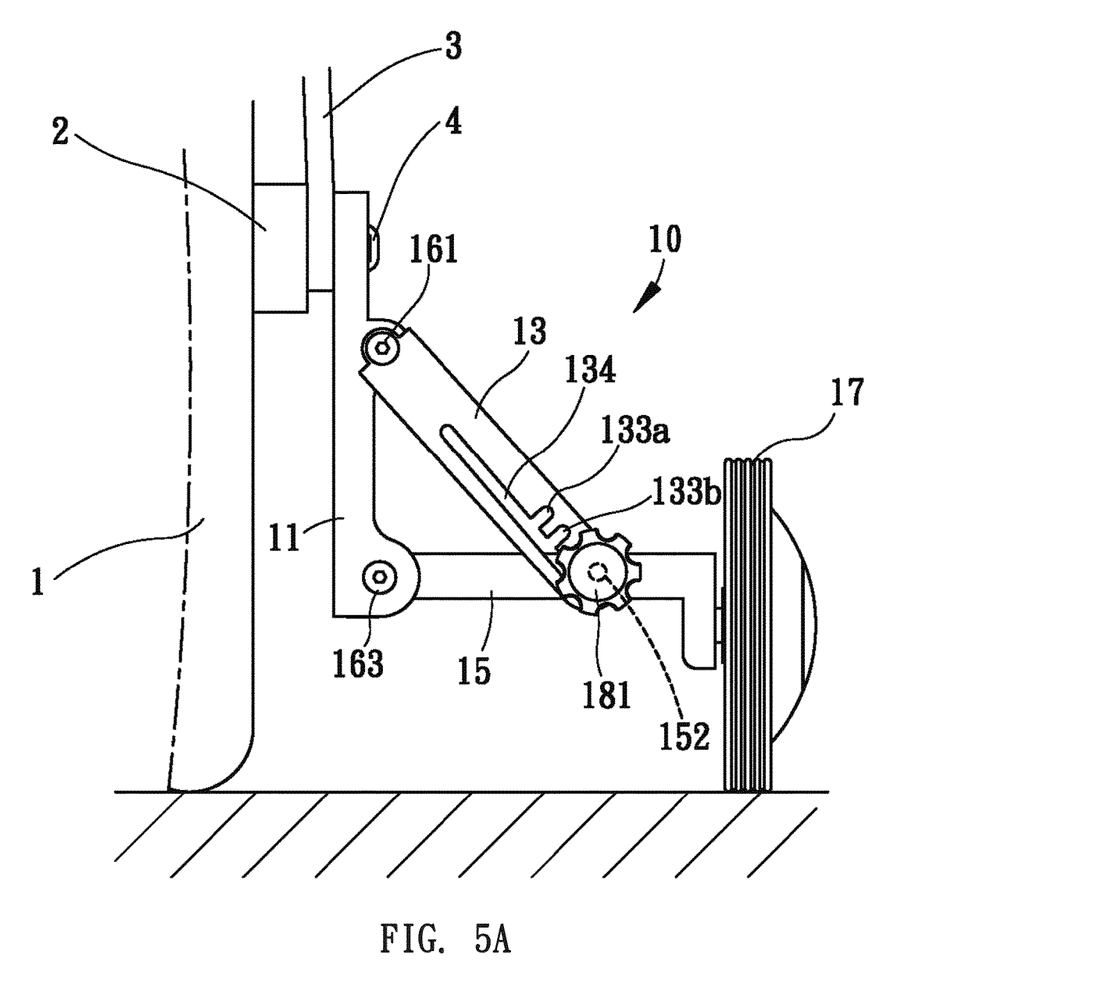
FIG. 5A is an assembled elevation view showing an auxiliary wheel structure for kid bicycle according to a second preferred embodiment of the present invention.

Please refer to FIG. 5A that is an assembled elevation view showing an auxiliary wheel structure for kid bicycle according to a second preferred embodiment of the present invention. The second preferred embodiment is generally structurally similar to the first preferred embodiment, except that the lifting arm 13 is provided with a narrow and long slot 134 and a plurality of concaved adjusting recesses 133*a-c* spaced along one side of the long slot 134 to communicate with the long slot 134. It is noted the adjusting recess 133*c* is not visible in FIG. 5A. When it is desired to adjust and accordingly change the pivotal interval between the pivotally connected lifting arm 13 and auxiliary wheel axle 15, such as, from the first pivotal interval L1 in FIG. 3 to the second pivotal interval L2 in FIG. 4A, simply move the control assembly 18 along the long slot 134 from the adjusting recess 133*c* (not shown in FIG. 5) to the adjusting recess 133*b* or 133*a* as appropriate. The concaved adjusting recesses 133*a-c* spaced along the long slot 134 provide more stable locating effect.

Figure 5B:
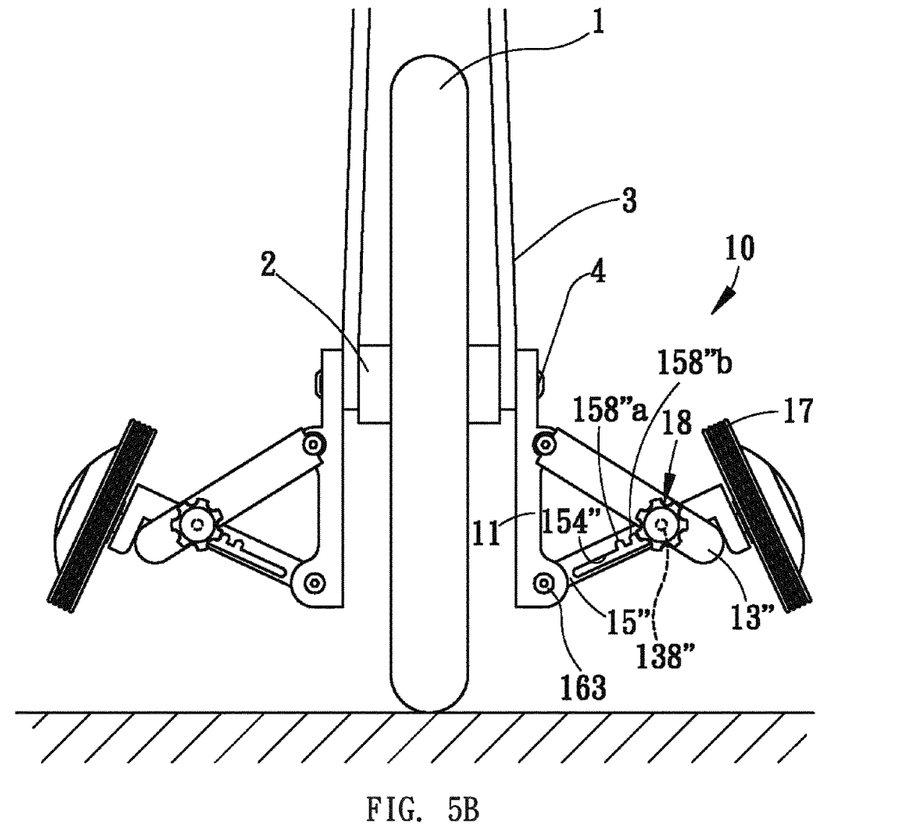
FIG. 5B is an elevation view showing a variation of the second preferred embodiment of the present invention with two auxiliary wheels on the kid bicycle adjusted to a lifted position.

FIG. 5B shows a variation of the second preferred embodiment of the present invention shown in FIG. 5A. In this variation, a lifting arm 13" is provided at a predetermined position with a small hole 138", and an auxiliary wheel axle 15" is provided with a narrow and long slot 154" and a plurality of concaved adjusting recesses 158" a-c spaced along one side of the long slot 154" to communicate with the long slot 154". It is noted the adjusting recess 158"*c* is not visible in FIG. 5B. Similarly, when it is desired not to use the auxiliary wheels 17, each of the control assemblies 18 can be moved along the long slot 154" toward an inner end of the auxiliary wheel axle 15" to selectively engage with one of the adjusting recesses 158"*c*, 158"*b* and 158"*a* as appropriate, and locked again. At this point, the auxiliary wheels 17 fixedly connected to the outer ends of the auxiliary wheel axles 15" are suspended in the air at two lateral sides of the rear wheel 1.

Figure 6A:
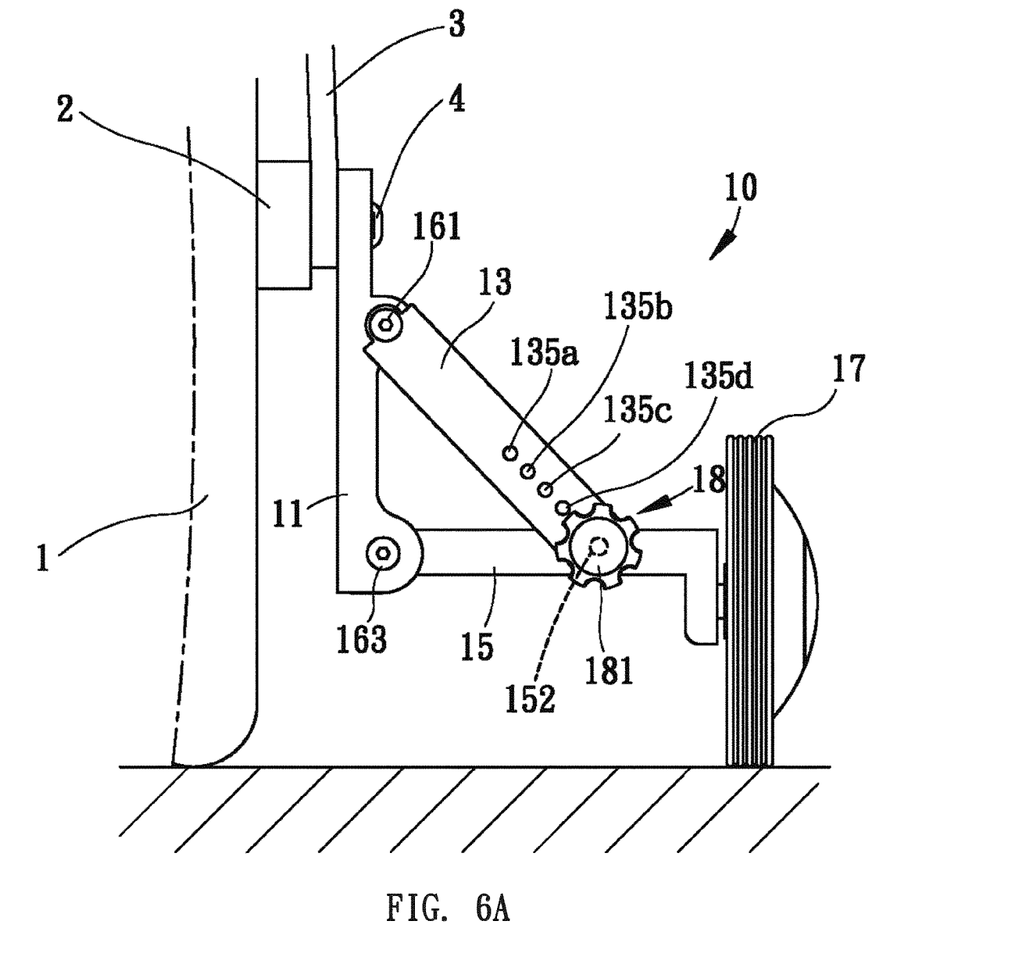
FIG. 6A is an assembled elevation view showing an auxiliary wheel structure for kid bicycle according to a third preferred embodiment of the present invention.

Please refer to FIG. 6A that is an assembled elevation view showing an auxiliary wheel structure for kid bicycle according to a third preferred embodiment of the present invention. The third preferred embodiment is generally structurally similar to the first preferred embodiment, except that the lifting arm 13 is provided with a row of adjusting holes 135*a-e* in the form of a small round hole each. It is noted the adjusting recess 135e is not visible in FIG. 6. The lifting arm 13 can be pivotally connected to the auxiliary wheel axle 15 by extending the screw rod 181 of the control assembly 18 through a desired one of the adjusting holes 135a-e and the small hole 152 on the auxiliary wheel axle 15 to engage with the nut 183, similar to the state shown in FIG. 2. With the row of adjusting holes 135a-e, stable and changeable pivotal connection of the auxiliary wheel axle 15 to the lifting arm 13 can be ensured.

Figure 6B:
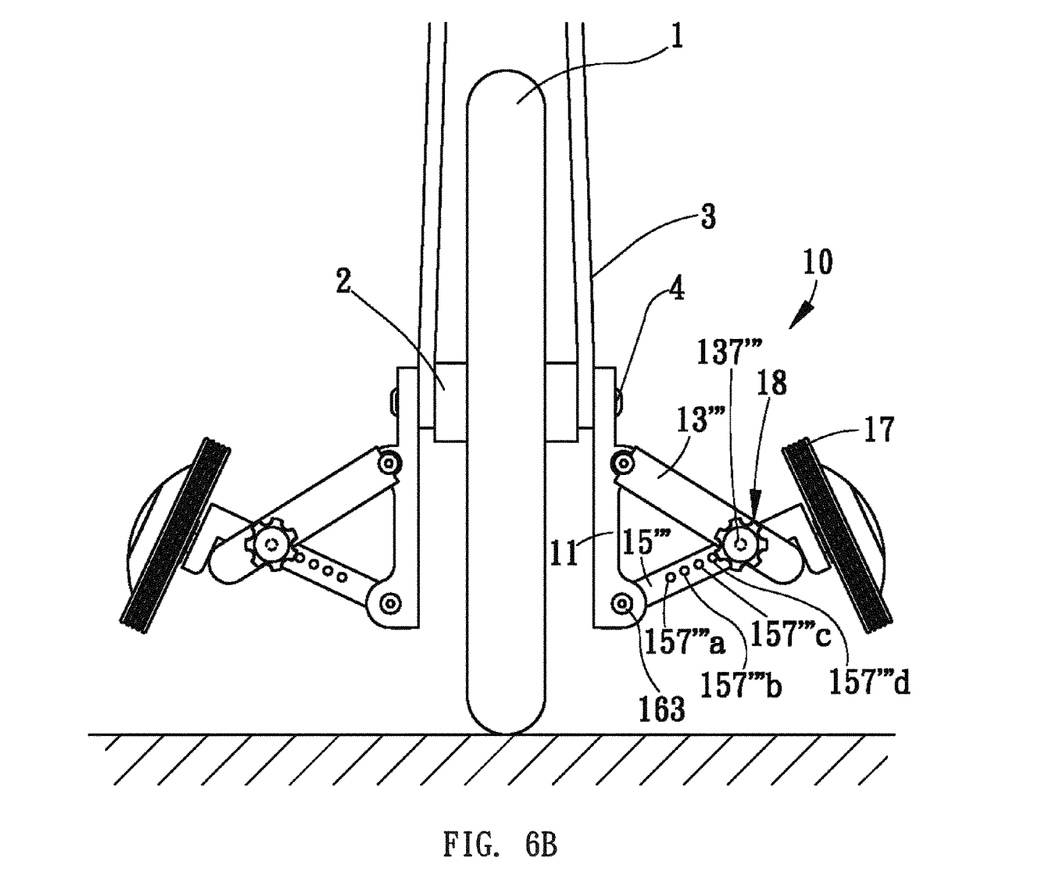
FIG. 6B is an elevation view showing a variation of the third preferred embodiment of the present invention with two auxiliary wheels on the kid bicycle adjusted to a lifted position.

FIG. 6B shows a variation of the third preferred embodiment of the present invention shown in FIG. 6A. In this variation, a lifting arm 13''' is provided at a predetermined position with a small hole 137''', and an auxiliary wheel axle 15''' is provided with a row of adjusting holes 157'''a-e. It is noted the adjusting recess 157'''e is not visible in FIG. 6a. Similarly, when two control assemblies 18 located at two lateral sides of the bicycle are correspondingly extended through one of the adjusting holes 157''' a-e on the two auxiliary wheel axles 15''', the state in which the auxiliary wheel axles 15''' are pivotally connected to the lifting arms 13''' can be adjusted and changed for the auxiliary wheels 17 and the rear wheel 1 of the bicycle to touch the ground surface at the same time, or for the auxiliary wheels 17 to suspend in the air at two lateral sides of the rear wheel 1 without touching the ground surface.

In brief, in an auxiliary wheel structure 10 for kid bicycle according to the present invention, the control assembly 18 can be adjusted to change a pivot joint of the linking arm 13 and the auxiliary wheel axle 15 and accordingly, the position of the auxiliary wheel 17 relative to the ground surface. The auxiliary wheel structure for kid bicycle according to the present invention can be easily operated to achieve stable and firm location of the auxiliary wheel 17 at a desired height relative to the ground surface, and the mounting bracket 11 and the lifting arm 13 thereof provide improved structural rigidity. Therefore, the auxiliary wheel structure of the present invention is more practical for use than the torsional spring and elastic clamping plate that are used in the conventional ways of suspending the unused auxiliary wheels to two lateral sides of the rear wheel of the kid bicycle.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An auxiliary wheel structure for kid bicycle, comprising:
a mounting bracket having a predetermined length being fixedly mounted to each of two ends of a hub of a rear wheel of a kid bicycle, and the mounting bracket being provided at predetermined positions with an upper through hole and a lower through hole in a horizontal direction;
a lifting arm pivotally connecting at an upper end to the upper through hole of the mounting bracket via a pivotal connection assembly, and the lifting arm being provided at a middle portion with a row of adjusting holes;
an auxiliary wheel axle pivotally connecting at an inner end to the lower through hole of the mounting bracket via a pivotal connection assembly, and connecting at an outer end to an auxiliary wheel, and the auxiliary wheel axle being further provided at a predetermined position with a small hole; and
a control assembly arranged to be insertably disposed through one of the adjusting holes on the lifting arm and the small hole on the auxiliary wheel axle to connect the lifting arm with the auxiliary wheel axle;
whereby when the control assembly is adjusted to insert through a different one of the adjusting holes on the lifting arm and the small hole on the auxiliary wheel axle, a pivotal interval between the pivotally connected lifting arm and auxiliary wheel axle is changed to thereby control an angle of inclination of the auxiliary wheel at each lateral side of the rear wheel of the kid bicycle;
wherein each of the adjusting holes on the lifting arm has a curved side forming a concaved recess, and an opposing side communicating with a long slot; and the control assembly is movable along the long slot to securely engage with any one of the adjusting holes.

2. The auxiliary wheel structure for kid bicycle as claimed in claim 1, wherein the adjusting holes on the lifting arm are communicable with one another to form a long slot.

3. The auxiliary wheel structure for kid bicycle as claimed in claim 1, wherein the adjusting holes on the lifting arm are separated small round holes, and the control assembly is extended through one of the adjusting holes and the small hole to securely engage the lifting arm with the auxiliary wheel axle.

4. The auxiliary wheel structure for kid bicycle as claimed in claim 1, wherein the control assembly includes a screw rod having an expanded head portion for a user to conveniently grip thereat, a washer, and a nut; and the screw rod being insertable through the washer, the lifting arm and the auxiliary wheel axle to engage with the nut.

5. An auxiliary wheel structure for kid bicycle, comprising:
a mounting bracket having a predetermined length being fixedly mounted to each of two ends of a hub of a rear wheel of a kid bicycle, and the mounting bracket being provided at predetermined positions with an upper through hole and a lower through hole in a horizontal direction;
a lifting arm pivotally connecting at an upper end to the upper through hole of the mounting bracket via a pivotal connection assembly, and the lifting arm being provided at a predetermined position with a small hole;
an auxiliary wheel axle pivotally connecting at an inner end to the lower through hole of the mounting bracket via a pivotal connection assembly, and connecting at an outer end to an auxiliary wheel, and the auxiliary wheel axle being further provided at a middle portion with a row of adjusting holes; and
a control assembly arranged to be insertably disposed through the small hole on the lifting arm and one of the adjusting holes on the auxiliary wheel axle to connect the lifting arm with the auxiliary wheel axle;
whereby when the control assembly is adjusted to insert through a different one of the adjusting holes on the auxiliary wheel axle, a pivotal interval between the pivotally connected lifting arm and auxiliary wheel axle can be changed to thereby control an angle of inclination of the auxiliary wheel at each lateral side of the rear wheel of the kid bicycle;
wherein each of the adjusting holes on the auxiliary wheel axle has a curved side forming a concaved recess, and an opposing side communicating with a long slot; and the control assembly is movable along the long slot to securely engage with any one of the adjusting holes.

6. The auxiliary wheel structure for kid bicycle as claimed in claim 5, wherein the adjusting holes on the auxiliary wheel axle are communicable with one another to form a long slot.

7. The auxiliary wheel structure for kid bicycle as claimed in claim 5, wherein the adjusting holes on the auxiliary wheel axle are separated small round holes, and the control assembly is extended through one of the adjusting holes and the small hole to securely engage the lifting arm with the auxiliary wheel axle.

\* \* \* \* \*